United States Patent

[11] 3,603,433

| [72] | Inventors | William H. Keathley<br>Pasadena;<br>Clarence J. Wesselski, Alvin, both of, Tex. |
|---|---|---|
| [21] | Appl. No. | 24,154 |
| [22] | Filed | Mar. 31, 1970 |
| [45] | Patented | Sept. 7, 1971 |
| [73] | Assignee | The United States of America as represented by the Administrator of the National Aeronautics and Space Administration |

[54] LOW ONSET RATE ENERGY ABSORBER
10 Claims, 2 Drawing Figs.

[52] U.S. Cl. ............................................. 188/1 C, 188/129
[51] Int. Cl. .............................................. F16f 7/12
[50] Field of Search .................................. 188/1 B, 1 C, 103, 129; 293/70; 267/135

[56] References Cited
UNITED STATES PATENTS

| 2,401,748 | 6/1946 | Dillon | 188/1 C UX |
| 2,682,931 | 7/1954 | Young | 188/1 |
| 3,369,634 | 2/1968 | Mazelsky | 188/1 |
| 3,354,991 | 11/1967 | Kenworthy | 188/67 |
| 3,412,628 | 11/1968 | De Gain | 74/492 |
| 3,435,919 | 4/1969 | Gularte et al. | 188/1 |
| 3,493,082 | 2/1970 | Bell | 188/1 C |

FOREIGN PATENTS

| 629,814 | 7/1963 | Belgium | 188/129 |

*Primary Examiner*—Duane A. Reger
*Attorneys*—Russell E. Schlorff, Marvin J. Marnock and G. T. McCoy

ABSTRACT: A low onset rate energy absorber for decelerating a moving mass at a controlled rate without amplification of loads through the system. The embodiment disclosed is in the form of a strut assembly for the crew couch of the Apollo command module. It includes a rod of substantially uniform diameter having one end arranged to receive the force of the moving mass thereagainst in a generally axial direction. A plurality of washers is mounted on the rod in spaced-apart and force-fitting relationship. It includes thrust means arranged to receive the force in the generally axial direction and for initially contacting and axially stroking an end one of the washers and sequentially stroking others of the washers along the rod in response to a force applied in the axial direction. The energy absorber uses friction as a direct means of converting the energy to heat.

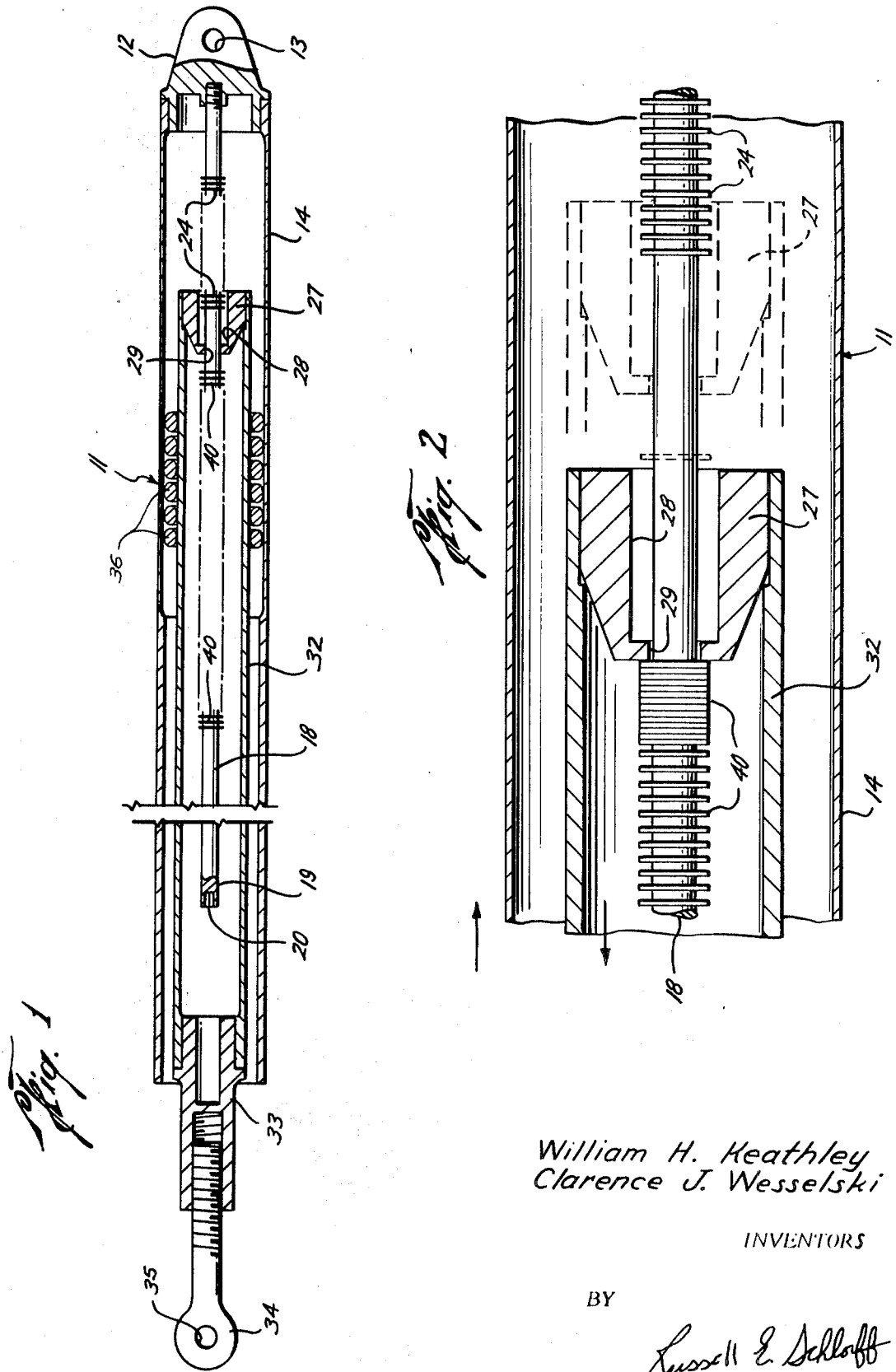

3,603,433

LOW ONSET RATE ENERGY ABSORBER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to an energy absorbing structure. More particularly, it relates to a reliable and efficient system for decelerating a moving mass at a controlled rate without amplification of loads through the system and one preferred embodiment is in the form of crew couch struts for the Apollo command module to absorb energy during the landing phase, for example.

2. Description of the Prior Art

Heretofore, crew couch struts for the Apollo command module were constructed from two tubes, an inner tube and an outer tube, one of which was arranged to move axially with respect to the other. The two tubes were separated by many small rings which were assembled in the form of bracelets. The outside diameters of the small rings were greater than the clearance between the two tubes, thereby making the rings deflect when the strut is assembled. When the assembled strut was stroked, all of the small rings would roll and deflect, thereby absorbing energy. By varying the number of bracelets in a given strut, the load level was controlled. One disadvantage of the aforesaid ring and bracelet system was that on impact, as for example on landing, the total load for which the struts were designed was applied in an extremely short period of time, the only time lag being the result of the material elongation. During this short time, the crew members were not firmly seated in the couches and the couches themselves were deflecting under the increased loading. When the crew members caught up with the couch and became firmly seated, they received shock loading which resulted in a "G" load approximately twice the amount for which the struts were designed. None of the other prior art of which the applicants are aware provides the necessary reliability and efficiency of decelerating a moving mass at a controlled rate without the amplification of loads through the system in a simple and easily constructed and maintained system, as in the present invention.

SUMMARY OF THE INVENTION

Accordingly, it is an object of this invention to provide an improved low onset rate energy absorber which solves the aforesaid problems and provides the desired characteristics, as stated above.

Briefly stated, this invention is for an energy absorbing structure which utilizes friction as a direct means of converting the energy to heat and achieves a low onset rate by applying the load in many small stages. The structure includes in combination a rod of substantially uniform diameter having one end arranged to receive the force of a moving mass thereagainst in a generally axial direction. A plurality of spaced apart washers is mounted on the rod in forced fitting relationship therewith. The invention also includes thrust means, such as a thrust ring, arranged to receive the force in the axial direction and to initially contact and axially stroke an end one of the washers and sequentially stroke others of the washers along the rod in response to a force applied thereto in the generally axial direction, whereby the energy of the force is absorbed during the stroking with an initial low onset energy rate of absorption.

In the preferred embodiment, the stroking portion of the rod is coated with a dry film lubricant, such as a fluorocarbon type. Preferably the rod is of INCONEL and the washers are of annealed stainless steel.

In addition, the washers are so sized that they have an initial inside diameter of about 2.5 percent smaller then the diameter of the rod, and are thereby force fitted on the rod to provide the desired energy absorbing characteristics.

In certain embodiments of the invention, a second plurality of spaced apart washers may be mounted on the rod in forced fitting relationship therewith, with the washers of the second plurality being arranged for contact by thrust means and for axial stroking on the rod when the force of a moving mass is applied in the opposite generally axial direction.

BRIEF DESCRIPTION OF THE DRAWING

Reference to the drawing will further explain the invention wherein like numerals refer to like parts, and in which:

FIG. 1 is a view generally in central section showing one embodiment of a strut assembly for a crew couch in the Apollo command module.

FIG. 2 is an enlarged view of a portion of the thrust means shown FIG. 1, with the initial position of the thrust means shown in dashed line and one actuated position shown in solid line.

DESCRIPTION OF THE PREFERRED EMBODIMENT

The strut assembly is generally designated by the numeral 11 and is comprised of a connector 12 having a bolt eye 13 at one end, which connector is arranged to receive the force of the moving mass thereagainst in a generally axial direction. Connector 12 is threaded or otherwise connected to external tube 14 which extends substantially the full length of the strut assembly, as shown.

The left end of connector 12, as viewed in the drawing, is provided with a threaded counterbore in which is threadably received one end of an INCONEL shaft or rod 18 which has a substantially constant or uniform diameter throughout its major length, which diameter may be on the order of about 0.375 inches. However, rod 18 is provided with a reduced diameter end portion designated by the numeral 19, which may have a smaller diameter on the order of about 0.012 inches smaller than the main portion of rod 18, the purpose of which is for sliding washers thereover which are to be described hereinafter. In addition, portion 19 may be provided with a counterbore hex-socket 20, which can be utilized to rotate rod 18 and thereby thread the same into and out of connector 12 during assembly and disassembly. In the embodiment shown, rod 18 has a diameter of 0.375 inches and is constant in diameter within 0.001 inches, except for portion 19 which is tapered to a diameter of 0.363 inches.

The surface of rod 18 should have an 8 to 16 microinch finish and is preferably hard relative to washers 24 and 40. The taper of end portion 19 may be on the order of approximately 1/4 inch/foot for installation purposes. Rod 18 may, for example, be made of 718 INCONEL which withstands velocities of at least 28 feet/sec., with the rod having a hardness of 40 Rockwell C.

Rod 18 has mounted thereon a first plurality of spaced apart washers which are mounted thereon in forced fitting relationship, which first plurality is generally designated by the numeral 24. Washers 24 are individually mounted on rod 18 by being slid over end portion 19 and pressed along rod 18 to the desired position and spacing. The spacing will be arranged such as to provide the strut assembly with the desired onset rate and energy absorbing characteristics.

The inside diameters of washers 24 were initially generally on the order of 2.5 percent or 0.010 inches, smaller than the diameter of the rod 18 throughout its major portion. Hence, by forcing the washers 24 along rod 18 to the position shown, the washer material tends to yield which causes each of the washers 24 to conform to rod 18 almost exactly the same as every other washer, making the load very uniform.

In the embodiment shown, it is preferred that the washers have a thickness on the order of 0.040 inches and an external diameter of 0.625 inches and an internal diameter of 0.363 inches, all plus or minus within 0.001 inches for tolerance purposes. Washers 24 are 28 in number and provide 27 spaces of 0.08 inches each and span a distance of 3.28 inches.

Washers 24 and 40 were machined from process-annealed bar stock and the faces were surface ground. When each of the washers 24 and 40 is pressed onto rod 18, the 0.010 inch interference causes the washer to yield, making it conform exactly to rod 18 without the necessity of extremely close tolerances on this part. Rod 18 then in effect becomes a sizing mandrel and causes each washer to offer the same frictional resistance to sliding. It is presently believed that the load will be a linear function of the thickness of the washers also. The outside diameter of the washer was selected to limit the bearing stress to approximately ½ the material yield strength. After machining of the washers was completed they were fully annealed in an inert gas atmosphere. Fully annealing 416 stainless steel requires that the material be held at 1600° F. for one hour, followed by cooling at a rate no faster than 50° F. per hour to 1100° F. The material may then be cooled at a faster rate, but care must be taken to insure that the material does not come in contact with air until room temperature is reached. Contact with air at elevated temperatures may cause heavy oxidation and scaling and both of these conditions may cause variations in the loads that the washers will produce.

As stated above, the washers 24 and 40 are made with an inside diameter which is approximately 2½ percent smaller than the rod size. Because the elastic limit on the strain is approximately 0.1 per cent, the entire washer is deformed plastically when it is driven on the shaft. The 2½ percent strain will not rupture the washer when it is fully annealed because the ultimate strain is approximately 30 per cent. This feature minimizes the effect of manufacturing tolerances which otherwise would have to be considered in construction of the apparatus.

The invention also includes thrust means arranged to receive the force in the generally axial direction and for initially contacting and axially stroking an end one of the washers 24, and sequentially stroking others of said washers along rod 18 in response to a force of a predetermined magnitude applied thereto in a generally axial direction, whereby the energy of the force is absorbed by the friction encountered during the stroking operation. These means are conveniently shown in the form of thrust ring 27 which is provided with a counterbore 28 and a central axial opening 29 to loosely accommodate passage of rod 18 therethrough. Thrust ring 27 is attached to the end of inner tube 32, the opposite end of which is attached to a coupling 33 having a threaded counterbore in the left hand view as seen in the drawing, which coupling is arranged to receive threaded connector 34 which is provided with bolt hole 35 for connection with portions of the couch assembly. Surrounding tube 32 and in contact with the inner wall of tube 14 are a plurality of toroidal members 36 which are plastically deformed due to the dimensional relationship between the size of the rings and size of the walls. The members 36 by cyclic deformation absorb a portion of the load.

During the landing phase of the Apollo command module, the various strut assemblies, two of which strut assembly 11 is illustrative, are arranged for absorption of compression and tension forces. In compression which may occur during tumbling of the spacecraft, the force of the moving mass is applied so as to compress connector 34 relative to connector 12. When this occurs, thrust ring 27 moves freely along rod 18 until contact is made with the end one of the plurality of spaced washers 24, and strokes the same to the right as viewed in FIG. 1, and subsequently picks up additional washers as the stroking continues. Energy is absorbed by the friction encountered during stroking washers 24 along the rod which generates heat. As each washer is picked up, the load is increased a small amount, thus spreading the total load over a significant time interval.

In the assembly shown, a second plurality of washers is shown mounted on rod 18 to accommodate deceleration of tension forces applied between connectors 34 and 12, which will occur during land landing of the spacecraft. Washers 40 are identical to washers 24, and in the embodiment shown are preferably spaced about 0.08 inches apart with a total of 76 washers of 0.040 thickness, thereby providing 75 spaces or a total span of 9.04 inches. Washers 40 are frictionally mounted on rod 18 in the same manner as washers 24, which mounting operation will be described in greater detail hereinafter.

During application of tensioning forces to connectors 34 and 12, thrust ring 27 contacts the end one of washers 40 and strokes the same along rod 18 and picks up additional washers 40, as shown in FIG. 2. The stroking action is similar to the stroking of washers 24 during compression, as described above.

Before installing washers 24 and 40 onto rod 18, it is important to thoroughly clean rod 18 of any grit, oil, or other foreign substance. This cleaning may be performed with freon to remove any such oil or grease prior to washer installation and preferably rod 18 should not be handled with the bare hand, since even the natural oil of the skin may cause erratic loads.

Rod 18 is then stood upright with tapered end portion 19 on top and the bottom of rod 18 rested on a wooden block on the floor for example. Thereafter the individual washers 24 and 40 are inserted onto the tapered end portion 19 of rod 18 and a bushing (not shown) is placed thereover. This bushing is made of steel, for example, and has an outside diameter of 0.562 inches, an inside diameter of 0.377 inches, and is approximately 0.50 inches long. Then an aluminum tube (not shown) having a ½-inch outside diameter and 0.045 inches wall thickness and being approximately 20 inches long is placed over the bushing. The aluminum tube is then tapped with a plastic hammer, for example, to drive and thereby force each washer over the tapered portion 19 and to thereafter drive or press the washers along rod 18 to the desired position where they frictionally engage rod 18. Washers 24 and 40 are arranged in the desired order and spacing to accomplish the desired deceleration rate required. The washers are spaced by an appropriate spacer which may be removed after installation of the washers.

By force fitting washers 24 and 40 on the rod 18, as described above, the major manufacturing tolerance problems on the washers is completely eliminated. By varying the number and spacing of washers 24 and 40 on rod 18, the desired load deceleration characteristics can be obtained for the assembly. By such a device a mass moving at 30 feet per second (20.4 miles per hour) may be brought to rest in 18 inches at a maximum "G" load of 14 and an onset rate of 350 "g'" per second.

After all the washers 24 and 40 have been installed in this manner, it is desirable that the entire rod and washer assembly be wiped clean and lubricated as described above with a dry film fluorocarbon type lubricant. At this point, rod 18 with the washers mounted thereon is ready for assembly in the strut assembly 11.

In the preferred embodiment, the stroking portions of rod 18 are provided with a liberal coat of dry film lubricant, preferably of the flourocarbon type, as for example the lubricant manufactured and sold under the name Miller Stephenson MS-122 which provides excellent results at velocities as high as 28 feet per second (19.1 miles/hr.). This lubricant is contained in a spray can and the active ingredient is tetrafluorethylene polymer solids. It is produced by the Miller Stephenson Chemical Company, Inc., Los Angeles, California and is covered under military specification MIL-L-60326(MU) Amend. 1 Type 1. The lubricant should be applied liberally to the rod prior to each washer installation and the rod should be thoroughly sprayed again prior to installation of the rod in the assembly. There should be an obvious buildup of lubricant on all stroking areas of the rod.

It is to be understood that lubricated sliding surfaces fall into two categories. The first category is hydrodynamic (or thick-film) lubrication in which ideally the surfaces never touch. The friction falls within the range of $u = 0.001$ to $0.0001$; no wear occurs. The second category is boundary (or thin-film) lubrication in which the high points on the surfaces touch. The friction falls within the range of $u=0.05$ to $0.15$; some wear occurs. The latter condition occurs when the pressure between the contact surfaces becomes so great that the lubricant film cannot support the load. In view of the above criteria, it is obvious that boundary lubrication is the most applicable to this friction mechanism. When the lubricant and the materials are chosen, the coefficient of friction usually falls in a much narrower range as long as severe wear (galling, seizing, etc.) does not occur. It is assumed that some wear is normal under boundary lubrication conditions, but it should not be visible to the eye; severe wear is abnormal and visible.

Rod 18 shown in the drawing is of 3/8 inch diameter, but other size rods may be utilized to carry out the invention. For example, hollow rods can be used for larger sizes to effect weight savings. The apparatus of this invention is not limited to use with struts but can be readily adapted to other devices requiring a one time high energy absorption with low onset rate. Other examples of uses of this device include embodiments in the form of collapsible steering columns, stroking automobile or aircraft seats, stroking automobile bumpers, highway barriers, air dropping sensitive equipment, or an overload device on aircraft landing gear.

One of the main advantages of the present invention is that it provides the low onset rate, and high rate energy absorber with a minimum of equipment. The energy absorber of this invention uses friction as a direct means of converting the energy to heat and achieves the low onset rate by applying the load in many small stages. Another major advantage of the equipment is the ability to absorb energy at the rate of 11 horsepower per square inch of contact area, while the conventional systems, such as brakes and clutches, have a maximum rate of about 0.5 HP/in$^2$ of contact area.

Because of the arrangement of washers 24 and 40 on rod 18 and because the washers are only picked up one at a time by thrust ring 27, the total load is realized only after a thrust stroke of some significant distance. By varying the spacing of the washers, the onset rate can be controlled. Similarly, the load can be controlled by the number of washers installed.

Further modifications and alternate embodiments will be apparent to those skilled in the art in view of this description and accordingly, the foregoing specification is considered to be illustrative only.

What is claimed is:

1. In an energy absorbing structure, the combination comprising:

a rod of substantially uniform diameter along the major length thereof and having one end arranged to receive the force of a moving mass thereagainst in a generally axial direction;

a plurality of spaced apart washers mounted on said rod in force fitting relationship therewith;

and thrust means arranged to receive said force in said generally axial direction and for initially contacting and axially stroking an end one of said washers and sequentially stroking others of said washers along said rod in response to a force applied thereto in said generally axial direction, whereby the energy of said force is absorbed during said stroking.

2. The invention as claimed in claim 1 wherein:

the stroking portions of said rod are coated with a dry film lubricant.

3. The invention as claimed in claim 1 wherein:

said rod is of INCONEL and said washers are of annealed stainless steel.

4. The invention as claimed in claim 1 wherein:

said washers have an initial inside diameter about 2.5 percent smaller than the diameter of said rod.

5. The invention as claimed in claim 1 including;

a second plurality of spaced apart washers mounted on said rod in force fitting relationship therewith, said second plurality of washers being arranged for contact by said thrust means and for axially stroking on said rod when the force of a moving mass is applied in the opposite generally axial direction.

6. The invention as claimed in claim 1 wherein:

said thrust means includes a thrust ring mounted about said rod and arranged for relative movement therewith during said stroking.

7. The invention as claimed in claim 6 wherein:

said rod forms part of a strut;

and including a tubular sleeve connected to a said thrust ring to form another part of said strut which is provided with means for absorbing normal expected loads.

8. The invention as claimed in claim 1 wherein:

the spacing between said washers is varied to provide a predetermined varying rate of deceleration of said moving mass during said stroking.

9. The invention as claimed in claim 2 wherein:

said lubricant is of the fluorocarbon type.

10. The invention as claimed in claim 7 wherein:

there is a plurality of plastically deformed toroidal members between the tubular sleeve and an outer tubular member of the strut, said toroidal members by cyclic deformation absorbing a portion of the load.